US009200922B1

(12) United States Patent
Murphy et al.

(10) Patent No.: US 9,200,922 B1
(45) Date of Patent: *Dec. 1, 2015

(54) DETERMINING USER ATTENTION (71) Applicant: Google Inc., Mountain View, CA (US)

(72) Inventors: Bruce W. Murphy, Pyrmont (AU); Grim H. Iversen, Trondheim (NO)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/475,944

(22) Filed: Sep. 3, 2014

Related U.S. Application Data

(63) Continuation of application No. 13/458,821, filed on Apr. 27, 2012, now Pat. No. 8,855,926.

(51) Int. Cl.
*G01C 21/34* (2006.01)
*G01C 21/26* (2006.01)
*G01C 21/36* (2006.01)
*H04W 4/02* (2009.01)

(52) U.S. Cl.
CPC ............ *G01C 21/3682* (2013.01); *H04W 4/02* (2013.01)

(58) Field of Classification Search
CPC .............................. H04W 4/02; G01C 21/3682
USPC .................................. 701/457, 400, 533, 538
See application file for complete search history.

(56) References Cited

U.S. PATENT DOCUMENTS

| | | |
|---|---|---|
| 7,373,246 B2 | 5/2008 | O'Clair |
| 7,698,059 B2 | 4/2010 | O'Clair |
| 8,068,980 B2 | 11/2011 | O'Clair |
| 8,136,044 B2 | 3/2012 | Muhonen et al. |
| 2007/0100802 A1 | 5/2007 | Celik |
| 2008/0109159 A1 | 5/2008 | Shi et al. |
| 2012/0150638 A1* | 6/2012 | Muhonen et al. ........... 705/14.49 |
| 2012/0303274 A1* | 11/2012 | Su et al. ......................... 701/533 |
| 2013/0093690 A1* | 4/2013 | Papakipos et al. ............. 345/173 |
| 2013/0212509 A1* | 8/2013 | Van Seggelen et al. ...... 715/771 |

OTHER PUBLICATIONS

'Wikipedia' [online]. "Location-based advertising," 2010, [retrieved on Jul. 2012]. Retrieved from the Internet: URL:<http://web.archive.org/web/20100903022056/http:/en.wikipedia.org/wiki/Location-based_advertising> 4 pages.

* cited by examiner

*Primary Examiner* — Fadey Jabr
*Assistant Examiner* — Yazan A Soofi
(74) *Attorney, Agent, or Firm* — Fish & Richardson P.C.

(57) ABSTRACT

Methods, systems, user interfaces, and apparatus, including computer programs encoded on a computer-readable storage medium, for presenting query results. A method includes: receiving a query; responsive to the query, providing a map including a viewport showing a first location and results that are associated with the query; receiving an indication that a user is interacting with the map, including panning, scrolling, repositioning, or zooming, to enable a second, different location to be visible in the viewport; determining that the user has arrived at the second, different location, the second, different location being visible in the viewport as a result of the panning, scrolling, repositioning, or zooming; automatically, without requiring the user to resubmit the query, re-running the query for the second, different location; and presenting query results along with the viewport showing the second, different location.

28 Claims, 6 Drawing Sheets

DETERMINING USER ATTENTION

CROSS REFERENCE TO RELATED APPLICATION

This application is a continuation application of, and claims priority to, pending U.S. patent application Ser. No. 13/458,821, filed on Apr. 27, 2012, entitled "Determining User Attention". The disclosure of the foregoing application is incorporated herein by reference in its entirety.

BACKGROUND

This specification relates to content presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for presenting query results. The method comprises: receiving a query; responsive to the query, providing a map including a viewport showing a first location and results that are associated with the query; receiving an indication that a user is interacting with the map, including panning, scrolling, repositioning, or zooming, to enable a second, different location to be visible in the viewport; determining that the user has arrived at the second, different location, the second, different location being visible in the viewport as a result of the panning, scrolling, repositioning, or zooming; automatically, without requiring the user to resubmit the query, re-running the query for the second, different location; and presenting query results along with the viewport showing the second, different location.

In general, another aspect of the subject matter described in this specification can be implemented in methods that include a method for presenting query results. The method includes: receiving a query; responsive to the query, providing a map including a viewport showing a first location and results that are associated with the query; receiving an indication that a user is interacting with the map, including panning, scrolling, repositioning, or zooming, to enable a second, different location to be visible in the viewport; determining that user interaction with the map has slowed to a level to allow for perception of content without necessarily having arrived at a final, different location, where the portion of the viewport at this time shows a second, different location; automatically, without requiring the user to resubmit the query, re-running the query for the second, different location; and presenting query results along with the viewport showing the second, different location.

In general, another innovative aspect of the subject matter described in this specification can be implemented in computer program products. A computer program product tangibly embodied in a computer-readable storage device and comprises instructions that, when executed by a processor, cause the processor to: receive a query; responsive to the query, provide a map including a viewport showing a first location and results that are associated with the query; receive an indication that a user is interacting with the map, including panning, scrolling, repositioning, or zooming, to enable a second, different location to be visible in the viewport; determine that the user has arrived at the second, different location, the second, different location being visible in the viewport as a result of the panning, scrolling, repositioning, or zooming; automatically, without requiring the user to resubmit the query, re-run the query for the second, different location; and present query results along with the viewport showing the second, different location.

In general, another innovative aspect of the subject matter described in this specification can be implemented in user interfaces. A user interface includes a map application. The map application is configured to: present a map, including a viewport; receive a first user input associated with a first location; submit a query associated with the first location; receive first query results associated with the query; present the first query results; receive a second user input indicating that a user is interacting with the map, including panning, scrolling, repositioning, or zooming, to enable a second, different location to be visible in the viewport; determine that the user has arrived at the second, different location, the second, different location being visible in the viewport as a result of the panning, scrolling, repositioning, or zooming; automatically, without requiring the user to resubmit the query, resubmit the query for the second, different location; receive second query results; and present the second query results along with the viewport showing the second, different location.

These and other implementations can each optionally include one or more of the following features. The map can be displayed on a mobile device. The query can be provided to a map application. The results can include advertisements. Receiving an indication that the user is interacting can include receiving a request for more data to populate the viewport based on the panning, scrolling, repositioning, or zooming. Determining that the user has arrived can be based at least in part on a relative acceleration of a user's panning movement. Determining that the user has arrived can be based at least in part on a relative deceleration of the user's panning movement. Receiving the indication that the user is interacting with the map can include receiving a mouse input. Receiving the indication that the user is interacting with the map can include receiving a touch input. Receiving the indication that the user is interacting with the map can include receiving a swipe gesture. Determining that the user has arrived can include determining that an end to the swipe gesture has been received. Determining that the user has arrived can include determining the user's intent to continue panning based on historical or previous panning steps. Determining that the user has arrived can further include one or more of determining if the user stops a moving map to stop a scroll, determining if the user's movements become slower, determining if the user's movements become shorter, determining if a transition has occurred from longer motions to shorter motions, determining if minor corrections are received, or determining that corrections to reverse direction are received. Determining that the user has arrived can further include one or more of determining if movement in the map ends at a conclusion of a long sweep motion, or determining if a ballistic scroll has occurred, where either of the aforementioned conditions are indicative of the user not arriving. Determining that user interaction with the map has slowed can include determining an initial rate of panning and a second, reduced rate of panning, where the second, reduced rate of panning is less than a threshold, and where the threshold is determined based on one or more of a size of the map, content to be displayed, and other factors Particular implementations may realize none, one or more of the following advantages. A query can be automatically rerun when it is determined that a user has navigated to a location of interest, without running queries for intermediate locations which are not locations of interest. A content sponsor (e.g., an advertiser) can avoid paying for presentation of content for locations that are not locations of interest associated with a user. A user can avoid seeing query results and related content for locations which are not associated with locations of interest.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

For situations in which the systems discussed here collect personal information about users or user devices, such as information about user inputs made using a map application, the users may be provided with an opportunity to opt in/out of programs or features that may collect personal information (e.g., information about a user's preferences, a user's current location, or a user's activities such as interactions with content items). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined.

Query results can be presented to a user for an updated location when it is determined that a user has, for example, stopped scrolling a map application. For example, a query, such as a query submitted by a user using a map application, can be received. In response to receiving the query, a map that includes a viewport showing a first location and results that are associated with the query can be provided. The results can be presented, for example, in the map application. An indication that the user is interacting with the map, such as panning, scrolling, repositioning, or zooming to enable a second, different location to be visible in the viewport, can be received. It can be determined, as a first example, that the user has arrived at the second, different location. As a second example, it can be determined that user interaction with the map has slowed to a level to allow for perception of content without necessarily having arrived at a final location. In either the first or second example, the query can be rerun for the second, different location automatically, without requiring the user to resubmit the query, and query results can be presented along with the viewport showing the second, different location.

Figure 1:
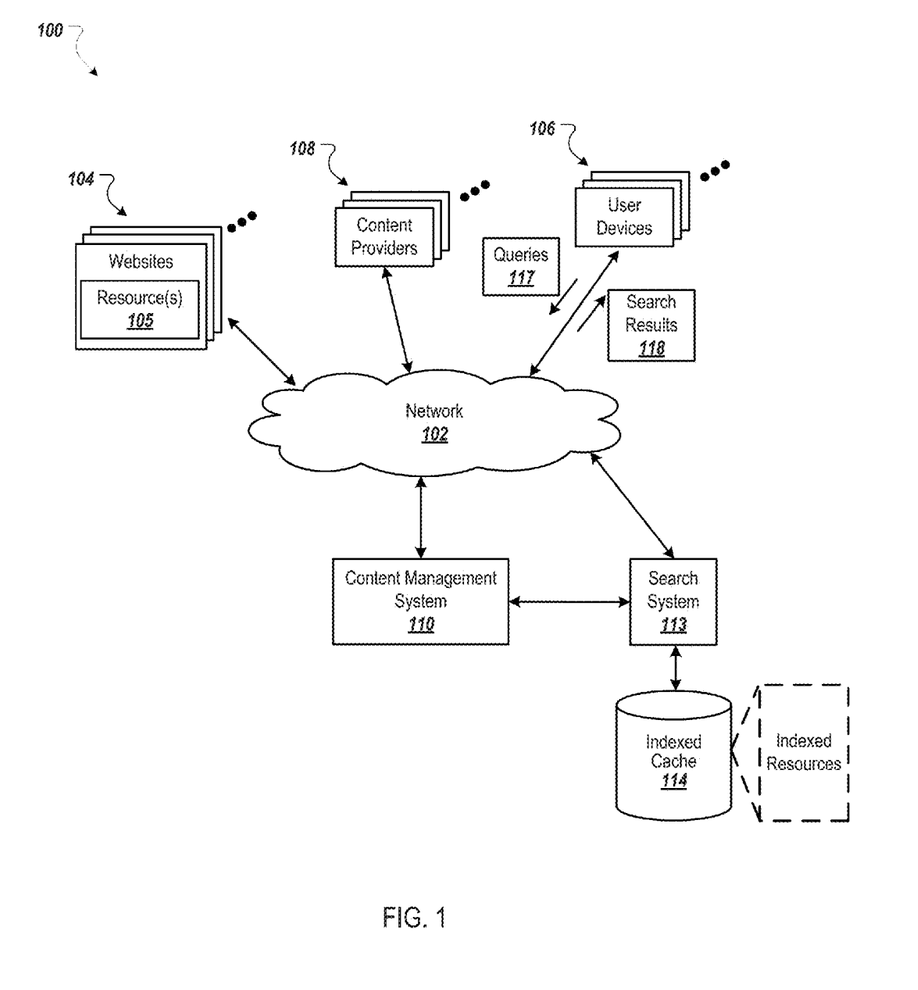
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as JavaScript scripts).

To facilitate searching of resources 105, the environment 100 can include a search system 113 that identifies the resources 105 by crawling and indexing the resources 105 provided by the content publishers on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources 105 over the network 102. Example user devices 106 include personal computers, tablet computers, mobile communication devices (e.g., smartphones), televisions, and other devices that can send and receive data over the network 102. A user device 106 typically includes one or more user applications, such as a web browser, to facilitate the sending and receiving of data over the network 102. The web browser can display various types of web applications, such as a map application.

A user device 106 can, for example, request resources 105 from a website 104. In turn, data representing the resource 105 can be provided to the user device 106 for presentation by the user device 106. As another example, user devices 106 can submit search queries 117 to the search system 113 over the network 102. The search queries 117 can include search queries performed using a map application. The search queries 117 can include location information indicating a location displayed in a viewport of the map application.

In response to a search query 117, the search system 113 can access the indexed cache 114 to identify resources 105 that are relevant to the search query 117. The search system 113 identifies the resources 105 in the form of search results 118 and returns the search results 118 to the user devices 106 in one or more search results pages. In some implementations, a search result 118 is data generated by the search system 113 that identifies a resource 105 that is responsive to a particular search query 117, and includes a link to the resource 105. An example search result 118 can include a web page title or video title, a snippet of text or a portion of an image extracted from the web page or video, and the URL (Unified Resource Location) of the web page. If the search query 117 is associated with a map application, the search results 118 can correspond to search results that are associated with a location that is displayed in the viewport of the map application.

A request for content can be received by the content management system 110 from a user device 106. The request for content can be associated with, for example, a request for a resource 105, a map request or a search query 117. The content management system 110 can select one or more additional content items to provide in response to the request. For example, the request for content can include characteristics (e.g., size, supported media types) of one or more content "slots" that are defined for the requested resource 105 or search results page. As another example, resource keywords associated with a requested resource 105 or a search query 117 can be provided to the content management system 110. As yet another example, a location associated with a search query 117 can be provided to the content management system 110. Content items selected by the content management system 110 can include content items having characteristics matching the characteristics of content slots and that are identified as relevant to specified resource keywords or search queries 117. For example, content items having targeting keywords that match the resource keywords or the search query 117 can be selected by the content management system 110. As another example, content items that are associated with a location that matches the location of a search query 117 can be selected. The content management system 110 can also select content items at least in part based on the results of an auction.

The content management system 110 or a map application running on the user device 106 or in association with a serving environment (e.g., a map application running in the cloud) can receive an indication that the user is interacting with a map displayed in the map application. For example, an indication that the user is panning, scrolling, repositioning, or zooming the map can be received. The content management system 110 or the map application can determine whether the user has arrived at a final location of interest, where the final location of interest is a location that the user intended as a destination of navigation, as compared to other, intermediate locations that the user may navigate to during the process of navigating to the final location of interest.

After detecting that the user is interacting with the map, the map application can wait to submit a search query and to request content items until it is determined that the user has arrived at the final location of interest. As described in more detail below, various approaches can be used to determine whether the user has arrived at the location of interest, such as by analyzing current or previous rates and lengths of inputs (e.g., rates or lengths of swipe gestures or other inputs), analyzing acceleration and deceleration rates of user interaction, determining that the user has panned in an opposite direction from a previous input, determining that the user is applying different amounts of pressure for current inputs as compared to previous inputs, and other approaches.

Based on determining that the user has arrived at the location of interest, the map application can automatically, without requiring the user to re-enter a search query, re-submit the search query to the content management system 110, for the location of interest. Query results can be presented along with a viewport displaying the location of interest. In some implementations, one or more markers may be displayed in the viewport corresponding to locations of query results. Other content, such as advertisements, may also be displayed along with the viewport and the query results.

Figure 2:
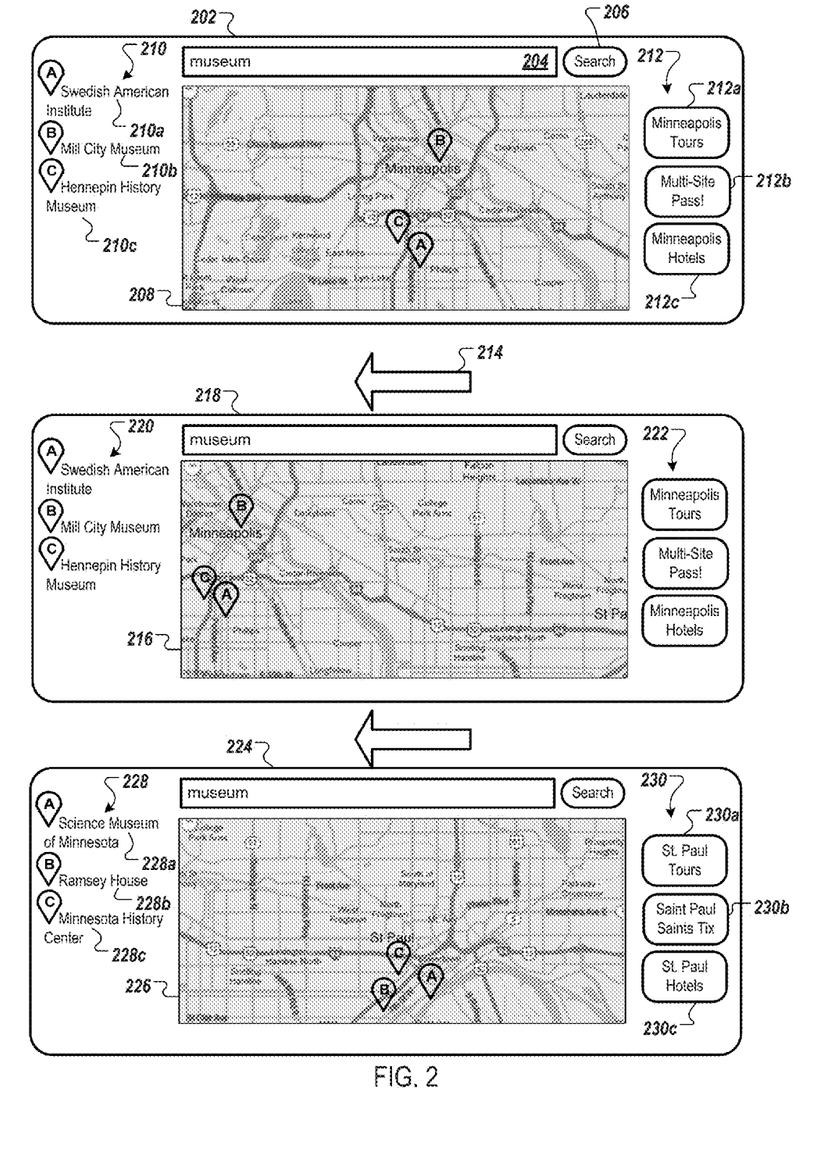
FIGS. 2 and 3 illustrate example displays.

FIG. 2 illustrates example displays, including a display 202. The display 202 may be, for example, the display of a mobile device, such as a mobile phone, PDA (Personal Digital Assistant), or tablet, a laptop, a desktop computer, or some other type of computing device. In some implementations, the display 202 is a touchscreen device. The display 202 is displaying a user interface for a map application. The user interface includes a search box 204, a search control 206, and a viewport 208.

The user can enter one or more search terms into the search box 204 and can select the search control 206. The one or more search terms can be sent to a search system. If the one or more search terms include location information, the location information can be used by the search system as a location of interest for a search. If the one or more search terms do not include location information, a location presented in the viewport 208 can be used as the location of interest for the search.

The one or more search terms can include other types of terms, such as one or more terms which represent one or more types of entities or establishments for which to search using the location of interest. For example, the search box 204 includes a search term of "museum". The search system, upon receiving a search request from the mobile device, can search for museums located in or near a location of Minneapolis that is presented in the viewport 208.

The search system can send search results to the mobile device, for presentation on the display 202. For example, the user interface includes search results 210, including search results "A" 210a, "B" 210b, and "C" 210c. Corresponding "A", "B", and "C" markers can be displayed in the viewport 208, at respective locations corresponding to the respective search results 210a, 210b, and 210c.

The search system can also send additional content, such as one or more advertisements, that can be related, for example, to the location of interest and/or to other search terms, to the mobile device, for presentation on the display 202. For example, the user interface includes content items 212, including a content item 212a for tours of Minneapolis, a content item 212b for a multi-site attraction pass, and a content item 212c for Minneapolis hotels.

After viewing the search results, the user may determine that they are interested in results for an area that is near to the location displayed in the viewport 208 but that is not currently displayed in the viewport 208. The user may, for example, perform one or more gestures or provide other user input to pan the viewport 208 to a new location. For example, on a touchscreen device, the user may select the viewport 208 (e.g., with a finger or stylus) and may "drag" the viewport 208 to a new location. For example, the user may be interested in museums located in or near St. Paul and may select the viewport 208 and drag the viewport 208 to the left, as indicated by an arrow 214.

In response to the left drag input, the location displayed in the viewport 208 may change to be a location east of the previously displayed location, such as a location displayed in a viewport 216 presented on a display 218. When a user is panning to a new location, the user may make several panning gestures before the viewport 216 displays the location the user is interested in. The viewport 216 may, therefore, display one or more intermediate locations which may not be locations of interest, before a location of interest is displayed.

The map application can wait to submit a rerun search query until it is determined that the user has navigated to a location of interest (e.g., the map application might not submit search requests for intermediate locations). Not submitting search queries for intermediate locations can be desirable, since a search request for an intermediate location may result in the presentation of search results and other content (e.g., advertisements) that the user is not interested in and the presentation of other content for which content sponsors (e.g., advertisers) are not interested in paying. As another example, search results and other content displayed at intermediate locations may not be perceivable by the user, since the user may submit additional user input while the intermediate location is displayed, to navigate toward the location of interest (e.g., the user may not have time to perceive search results or other content before another user input is made). As another example, while intermediate locations are being displayed, such as while the user is making multiple swipe gestures, the map may be moving too fast for the user to perceive search results. Submitting a search request for the location of interest and not for intermediate locations can result in presentation of search results and other content (e.g., advertisements) that are of interest to the user.

In some implementations, previously-displayed search results and related content is maintained on the user interface as the user navigates to intermediate locations. For example, search results 220 and content items 222 displayed on the display 218 are the same as the search results 210 and the content items 212 displayed on the display 202 (e.g., no new search results or related content items are displayed on the display 218). In some implementations, some or all currently-displayed search results and related content items are removed from the screen if the user navigates to an intermediate location that is at least a threshold distance from a previous location associated with the search that resulted in the display of the currently-displayed search results (e.g., if the user navigates to an intermediate location that is more than fifty miles from Minneapolis, the search results 220 and the content items 222 may be removed from the display 218).

If it is determined that the user has navigated to a location of interest, the map application can automatically request a search using the location of interest as a point of reference. In response to the search request, a search can be performed and search results and related content can be sent to the mobile device and presented on the display 218. For example, as illustrated on a display 224, which displays a location of interest of Saint Paul in a viewport 226, new search results 228 and new content items 230 are displayed. The new search results include search results "A" 228a, "B" 228b, and "C" 228c and the new content items 230 include a content item 230a for tours of Saint Paul, a content item 230b for tickets to a Saint Paul baseball team, and a content item 230c for Saint Paul hotels.

Various approaches can be used to determine if a user has arrived at a location of interest. For example, if a user is panning, zooming, repositioning, or scrolling a map using, for example, one or more swipe gestures, the map may, in response to the gestures, move ballistically. That is, the map may continue to move after the user has completed a gesture (e.g., after the user has lifted their finger off of a touchscreen, or after the user has released a mouse button or has stopped moving a mouse). If the user "grabs" or re-clicks the map to stop the movement of a ballistically moving map, it can be determined, for example, that the user is stopping the movement of the map because the map is showing the location of interest.

As another example, it can be determined that the user has arrived at a location of interest if the user's pan, scroll, reposition or zoom gestures become slower (e.g., more than a threshold slower) than initial pan, scroll, reposition, or zoom gestures. For example, a user's inputs may be causing the movement of the map to decelerate (e.g., the map may continue to move as the user makes a series of scrolling, panning, repositioning, or zooming gestures, but a rate of movement may decelerate as the location of interest is approached). In a similar example, it can be determined that the user has arrived at a location of interest if the user's pan, scroll, reposition, or zoom gestures become shorter (e.g., more than a threshold shorter) than initial or recent pan, scroll, reposition, or zoom gestures. In some implementations, a determination that the user has arrived at the location of interest can be made if it is determined that the user has made a series of long, sweeping pan, scroll, reposition, or zoom gestures, followed by one or more short, repositioning gestures.

As described in more detail below, a user can be said to have arrived at the location of interest if a short movement in an opposite direction as compared to a long movement is detected. For example, the user may scroll past the location of interest and may make a movement to scroll or pan back to the location of interest.

On touchscreen and other devices, the pressure applied to the display 224 can be measured during user inputs, and the measured pressure can be used to determine whether a user has arrived at a location of interest. For example, it can be determined that the user generally uses lighter, faster gestures to make large panning movements as compared to slower, harder (e.g., using more pressure) movements that are used for more deliberate, repositioning movements. The pressure, length, type, sequence and/or the speed of gestures can be analyzed to determine whether the user has arrived at a location of interest.

In some implementations, it can be detected that the user has not arrived at the location of interest. For example, it can be determined that the user has not arrived if the most recent user input is an uninterrupted scroll, pan, reposition, or zoom gesture. As another example, it can be determined that the user has not arrived if an amount of panning, scrolling, repositioning, or zooming of the most recent gesture is greater than a threshold.

In general, users pan, scroll, reposition, and zoom at different speeds and in different amounts. In some implementations, a ballistic model can be determined for each user. For example, a user's pan, scroll, reposition, and zoom movements can be tracked for one or more applications, along with information about each input, such as an input speed, input type, input pressure, and length of input (e.g., a distance panned, scrolled, repositioned, or zoomed). In some implementations, a model can be determined for each user or each device used by the user. For example, a first model for a touchscreen device used by a first user can be determined and a second model for a laptop device used by the first user can be determined. Multiple models can be determined per user, since users may use different types of input on different devices. For example, the first user may pan, scroll, reposition, or zoom differently (e.g., using different speeds, different amounts) on the touchscreen device and the laptop device. As another example, a baseline model may be determined which represents inputs (e.g., the speed and length of inputs) of users in general.

The user-specific model and/or the baseline model may be used when determining whether the user has arrived at a location of interest. For example, the user-specific model and/or the baseline model may be used to determine whether a user's most recent input corresponds to a "long" or to a "short" movement, in relation to the user's typical movements or to users' movements in general. As another example, one or models may be used to determine a relative "fast" or relative "slow" input. One or more thresholds may be determined, such as at 10% and/or 90% levels of histograms generated from speed and/or distance models.

In some implementations, a determination may be based on a difference between a speed of a current input and a speed of a previous input. For example, it can be determined that a user is panning, scrolling, repositioning, or zooming, and a first rate of panning, scrolling, repositioning, or zooming can be determined (e.g., an initial rate, a maximum rate, or a "locked-in" rate can be determined). The rate of the user's subsequent panning, scrolling, repositioning, or zooming gestures can be monitored, and it can be determined that a subsequent rate is less than the first rate (e.g., the inputs are becoming slower) and that the difference between the first rate and the subsequent rate is more than a threshold. Such a determination can be used to determine that the user's movements are slowing down and that the user has arrived at a location of interest.

Figure 3:
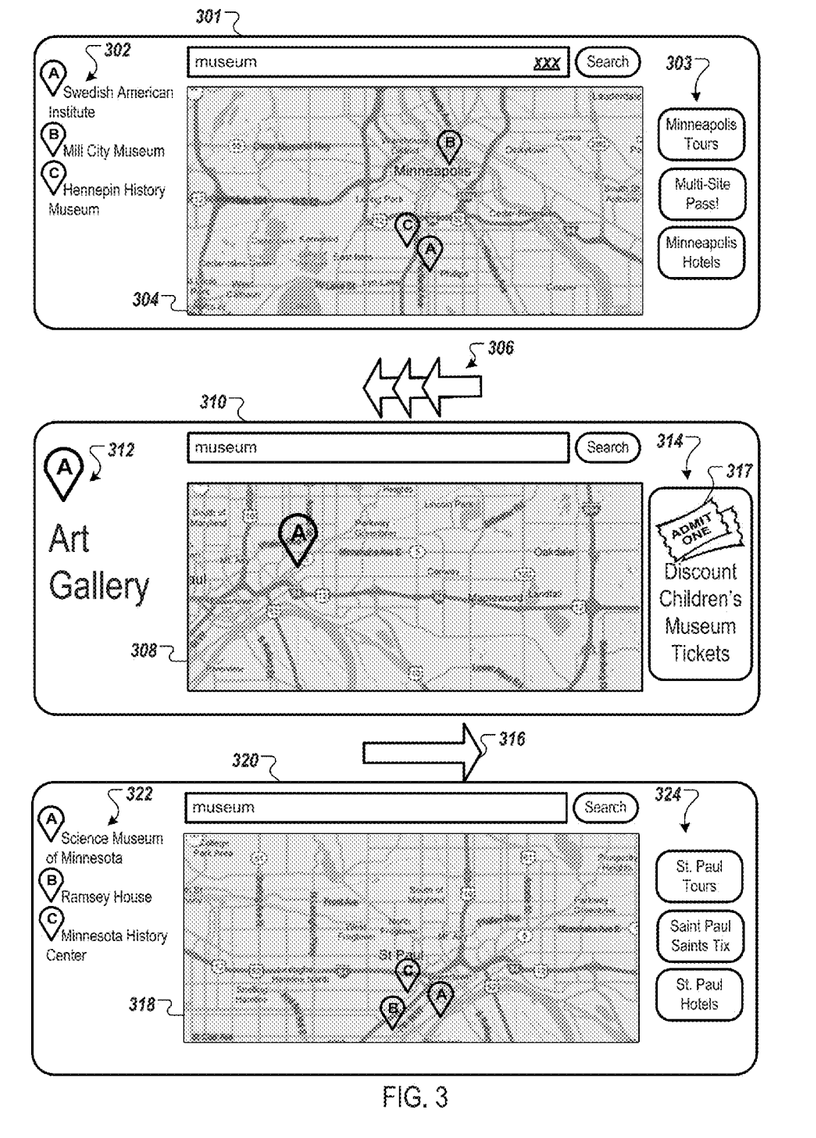

FIG. 3 illustrates an example display 301. The display 301 shows a user interface state that is the same as that displayed on the display 202, with search results 302, content items 303, and a viewport 304 corresponding to the search results 210, the content items 212, and the viewport 208, respectively. User input may be received, for example, to view a new portion of the map (e.g., by moving the map to the left, using a series of gestures, as illustrated by arrows 306). At the end of the series of user inputs, the speed of the user inputs may decrease as compared to the speed of the first inputs in the series. A gesture in the series may result in the displaying of a new location in the map, as shown in a viewport 308 on a display 310.

In some implementations, a search request may be automatically submitted for a displayed location if it is determined that user interaction with the map has slowed to a level to allow for perception of content without necessarily having arrived at a final location of interest. The displayed location may not be the location of interest, but it may be near the location of interest, based on the slowing of the user's movements. In response to submission of the search request, a search can be performed and search results and other content can be sent to the mobile device, for presentation on the display 310. For example, a search result 312 and a content item 314 are presented on the display 310. Note, the search query formed can be based at least in part on a previous search query received from the user. The user, however, is not required to re-enter the previous query.

In some implementations, the number and/or size of search results, the number and/or size of other content items, or other aspects of presentation of the search results and/or content items may be determined based on the current speed of the user interaction. For example, it may be determined, based on the current speed of user interaction, that the user can perceive one large search result and one large content item. For example, one search result rather than three may be displayed (e.g., the one, larger search result 312 may be displayed on the display 310, as compared to the three, smaller search results 302 displayed on the display 301). The search result 312 can be displayed using, for example, a larger marker, or in a larger font, as compared to the search results 302). Similarly, one content item rather than three may be displayed (e.g., the one, larger content item 314 may be displayed on the display 310, as compared to the three, smaller content items 303 displayed on the display 301). The content item 314 can be displayed for example, in a larger font, as compared to the content items 303 and/or can be displayed, for example, using a graphic or icon (e.g., a graphic 317) that may be determined to be recognizable at the current speed of user interaction.

As described above, a determination can be made that the user has arrived at a location of interest, for example, based at least in part on detecting that the user made a first user input in one direction followed by a smaller user input in the opposite direction (e.g., the second user input can be a minor, repositioning input that is a correction to a major, longer first user input). For example, the location displayed on the viewport 308 may be a location that is east of a desired location of Saint Paul. The user can drag the map in a direction opposite from a previous input, as illustrated by an arrow 316. In response to the user input in the opposite direction, a map of Saint Paul can be displayed, such as shown in a viewport 318 presented on a display 320.

In response to determining that Saint Paul is the location of interest, a search request for Saint Paul can be automatically submitted for the Saint Paul location. Search results and other content can be sent to the mobile device and can be presented on the display 320. For example, search results 322 and content items 324 are displayed.

Figure 4:
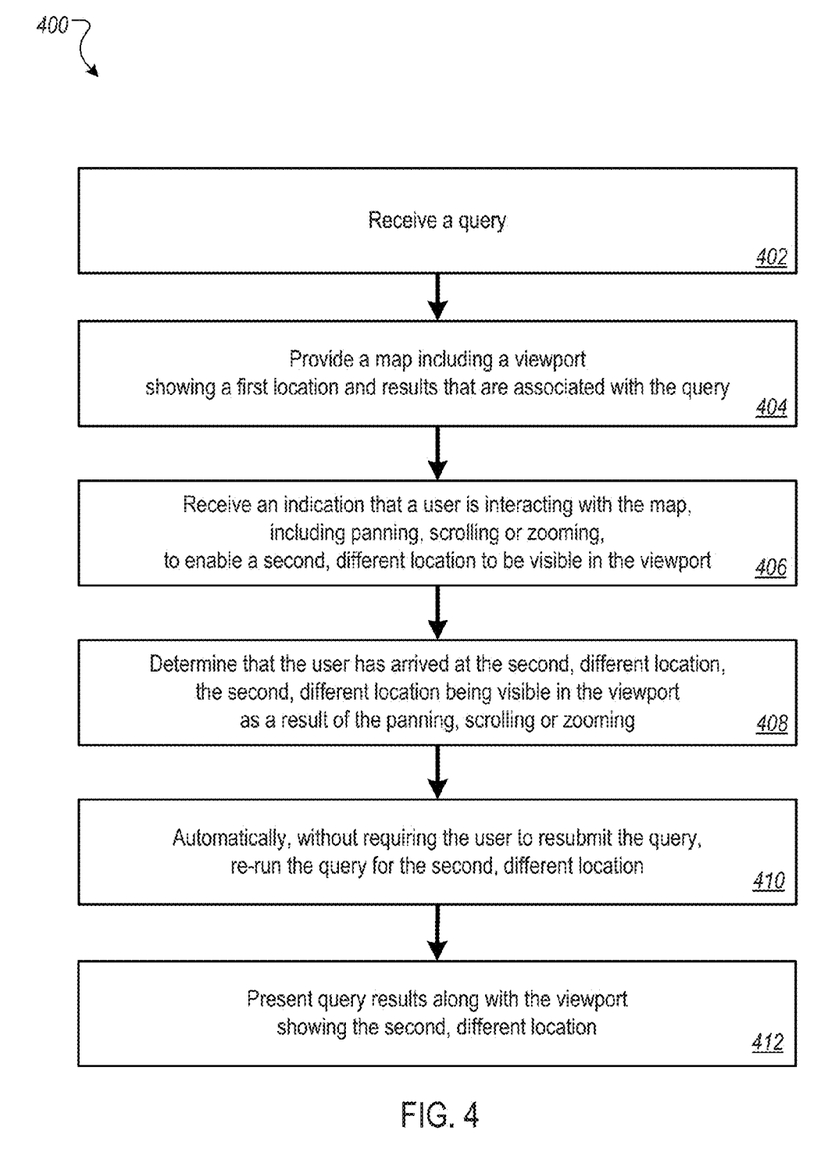
FIGS. 4 and 5 are flowcharts of example processes for presenting query results.

FIG. 4 is a flowchart of an example process 400 for presenting query results. The process 400 can be performed, for example, by the content management system 110 described above with respect to FIG. 1.

A query is received (402). For example, a search query can be received from a user device, such as the user device 106. The user device 106 can be, for example, a touchscreen device, a tablet device, a laptop device, or some other type of computing device. The query can be provided, for example, to a map application. The query can include location information. For example, the query can include one or more search terms (e.g., a city name, a city and state name, a zip code) which indicate a location. As another example, the query may include location information which indicates a location displayed in a viewport on the user interface from which the query was submitted. The query may include one or more other query terms, such as one or more query terms which indicate a point of interest (e.g., a business entity or establishment type) for which to search using the location information included in the query.

Responsive to the query, a map is provided, including a viewport showing a first location and results that are associated with the query (404). For example, with respect to FIG. 2, the viewport 208 is displayed, showing a location of Minneapolis. If the query includes location information, the first location shown in the viewport can be a location corresponding to the location included in the query. If the query does not include location information, the first location can be, for example, a default location or a location previously displayed in the viewport.

The results can include, for example, one or more points of interest that correspond to one or more search terms included in the query. For example, if the query terms include one or more query terms which are determined to not be location-related query terms, the results can include one or more points of interest that are located in the first location and that match one or more of the query terms. For example, with respect to FIG. 2, search results 210 are displayed next to the viewport 208 and corresponding markers are displayed in the viewport 208. The results can also include other content, such as one or more advertisements. For example, content items 212 are displayed next to the viewport 208. The content items can be selected, for example, based on the first location and/or based on other, non-location related query terms or other data (e.g., profile data associated with the user).

An indication that a user is interacting with the map is received, including panning, scrolling, repositioning, or zooming, to enable a second, different location to be visible in the viewport (406). For example, one or more user inputs can be received. The user can, for example, perform a swipe gesture, "grab and drag" the map, click and drag the map, select a user interface control for panning, scrolling, repositioning, or zooming, or perform some other gesture or input for panning, scrolling, repositioning, or zooming. The user input can be performed, for example, with one or more fingers, a mouse, a stylus, or some other user input device. For some or all user inputs, a rate of the user input can be determined (e.g., a rate of speed of a swipe gesture). As another example, a length (e.g., the length of a swipe gesture) of the user input can be determined. If the user device is a touch-screen device, an amount of pressure used for the user input can be determined.

A request can be received for more data to populate the viewport based on the panning, scrolling, repositioning, or zooming. For example, a request for map data for a new location (e.g., a location to which the user has panned, scrolled, repositioned, or zoomed) can be received. The map data can be sent to the user device and an updated location can be displayed in the viewport. The requests for more data can correspond to a location of interest (e.g., including a final location or one or more intermediate locations).

A determination is made that the user has arrived at the second, different location (408), the second, different location being visible in the viewport as a result of the panning, scrolling, repositioning, or zooming. The second location can be, for example, a location the user is interested in (e.g., a location of interest), as compared to intermediate locations that are not locations of interest that the user may scroll, zoom, reposition, or pan by while navigating to the location of interest.

Various approaches can be used to determine that the user has arrived at the second location. For example, a determination can be made based at least in part on a relative acceleration or a relative deceleration of a user's interaction (e.g., panning movement). For example, a user may make a series of inputs (e.g., gestures) to navigate from the first location to the second location. For example, a user may, when first panning a map, make one or more fast, light, long sweeping gestures, and if multiple sweeping gestures are used, the user may accelerate the sweeping gestures if the user has a long distance to pan (e.g., indicative that the user has not arrived at the second location) and may begin to decelerate the sweeping gestures as the user approaches the second location.

Other examples include determining if the user's movements become slower and/or if the user's movements become shorter. For example, with respect to FIG. 2, given a first location of Minneapolis as shown in the viewport 208, the user may make a series of sweeping gestures to navigate eastward in the map to a second location of Saint Paul (e.g., as shown in the viewport 226). After one such sweeping gesture, an intermediate location may be displayed in the map, as shown in the viewport 216. The initial sweeping gestures may be longer and faster, as compared to gestures made as the user approaches Saint Paul, with the later gestures becoming shorter and slower as the user makes more refined movements to position the map at the desired, second location.

Determining whether the user's movements "are short", "have become shorter", "are slow", or "have become slower", etc., can be determined by comparing a rate or length of a previous movement to a rate or length of a current movement, and comparing a rate or length difference to a threshold. Other examples include determining a model for a user or for a user and device combination, determining typical rate and length of movements for the user or user and device combination, and comparing a current rate or length to one or more thresholds determined from the model (e.g., a "short" movement for a user may be a movement that is at a 10% threshold level determined from the model for the user, meaning that the movement is shorter than 90% of movements typically made by the user). As another example, a model representing typical movements of all users (or all users using a certain type of device) can be determined, and one or more thresholds may be determined from or based on such a model.

Other example methods for determining that the user has arrived at the second location include determining that the user has stopped a moving map to stop a scroll. For example, with respect to FIG. 2, the user may have stopped movement of the map presented in the viewport 226 once the map displayed a desired, second location of Saint Paul. If the user does not stop a moving map, such a lack of user interaction can indicate that the user has not arrived at the second location. The map may be moving, for example, due to a ballistic scroll feature of the map application (e.g., if a user performs a sweep gesture, the map movement may have "momentum" and the map may continue moving after the user completes the gesture. Whether the user interrupts a ballistic scroll can indicate whether the user has arrived at the second location.

The pressure applied during a gesture can also indicate whether the user has arrived at the second location. For example, initial, longer movements may be tend to be performed with faster, lighter gestures, and minor, repositioning movements may tend to be made with slower gestures performed with harder, more deliberate pressure. Smaller, repositioning gestures can indicate that the user has arrived at the second location. As a specific example, a repositioning gesture which reverses direction of the previous gesture can indicate that the user is making final repositioning gestures to position the map at the second location. For example, with respect to FIG. 3, a previous gesture may have positioned the map to a location east of a desired location of Saint Paul, as shown in the viewport 308, and a repositioning gesture that reverses direction of the previous gesture may result in the map displaying the desired location of Saint Paul, as shown in the viewport 318.

The query is automatically re-run for the second, different location (410), without requiring the user to resubmit the query. For example, the second, different location and any non-location query terms included in the initial query can be submitted to a search system. The search system can send one or more results to the user device. For example, with respect to FIG. 2, if it has been determined that the location of Saint Paul shown in the viewport 226 is the second location (e.g., the location of interest), location information indicating the displayed location and a query term of "museum" can be submitted to the search system.

Query results are presented along with the viewport showing the second, different location (412). The results can include, for example, one or more points of interest that correspond to one or more search terms included in the query. For example, with respect to FIG. 2, search results 228, which each correspond to the location of Saint Paul and to the query term of "museum", are displayed next to the viewport 226 and corresponding markers are displayed in the viewport 226. The results can also include other content, such as one or more advertisements. For example, content items 230 are displayed next to the viewport 226, where each of the content items 230 corresponds to the location of Saint Paul and/or to the query term of "museum".

Figure 5:
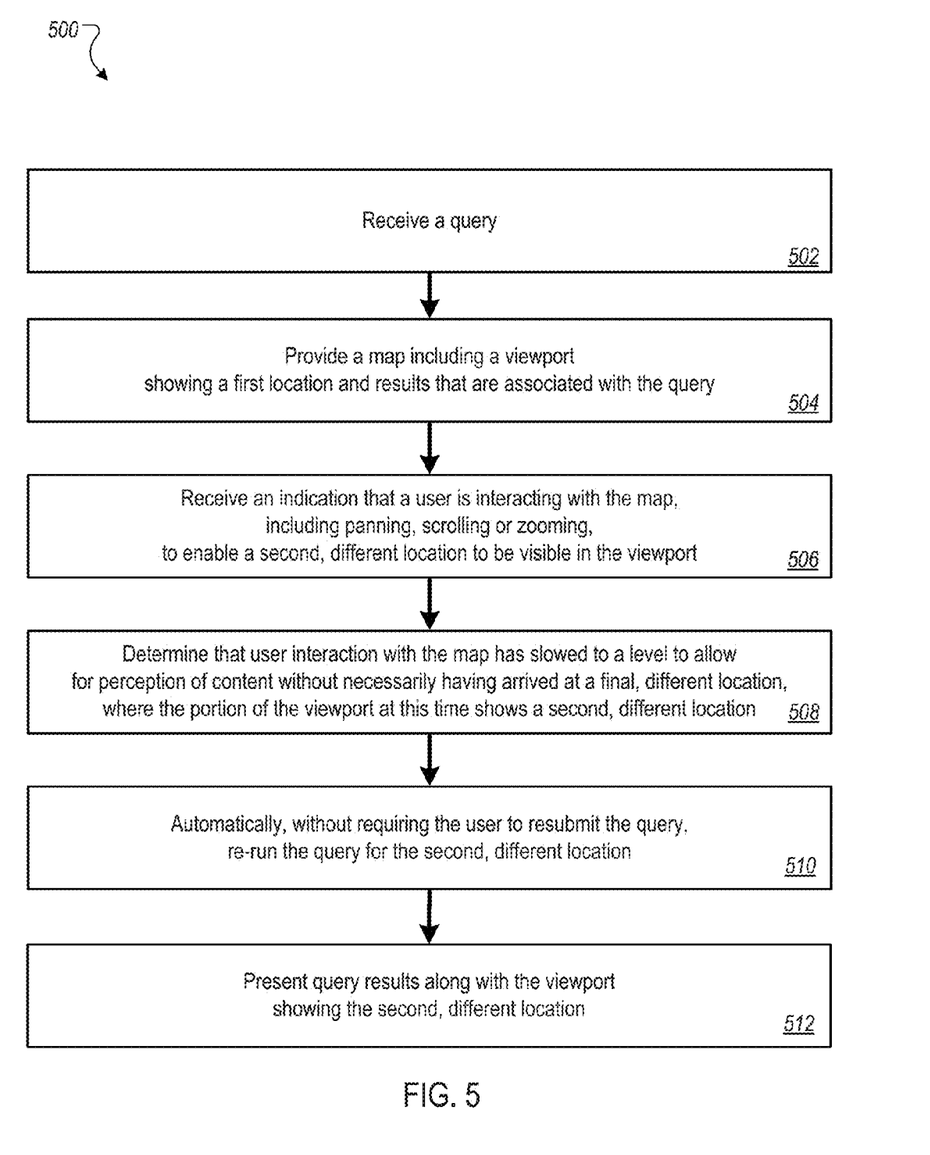

FIG. 5 is a flowchart of an example process 500 for presenting query results. The process 500 can be performed, for example, by the content management system 110 described above with respect to FIG. 1.

A query is received (502). For example, a search query can be received from a user device, such as a mobile device. The query can be provided, for example, to a map application. The query can include or be associated with location information. For example, the query can include one or more search terms (e.g., a city name, a city and state name, a zip code) which indicate a location. As another example, the query may include location information which indicates a location displayed in a viewport on the user interface from which the query was submitted. The query may include one or more other query terms, such as one or more query terms which indicate a subject or point of interest (e.g., a business entity or establishment type) for which to search using the location information included in the query.

Responsive to the query, a map is provided, including a viewport showing a first location and results that are associated with the query (504). If the query includes location information, the first location shown in the viewport can be a location corresponding to the location included in the query. If the query does not include location information, the first location can be, for example, a default location or a location previously displayed in the viewport. The results can include, for example, one or more points of interest that correspond to one or more search terms included in the query. For example, if the query terms include one or more query terms which are determined to not be location-related query terms, the results can include one or more points of interest that are located in the first location and that match one or more of the query terms. The results can also include other content, such as one or more advertisements. The content items can be selected, for example, based on the first location and/or based on other, non-location related query terms.

An indication that a user is interacting with the map is received, including panning, scrolling, repositioning, or zooming, to enable a second, different location to be visible in the viewport (506). For example, one or more user inputs can be received. The user can, for example, perform a swipe gesture, "grab and drag" the map, click and drag the map, select a user interface control for panning, scrolling, repositioning, or zooming, or perform some other gesture or input for panning, scrolling, zooming, re-positioning or manipulating the map. The user input can be performed, for example, with one or more fingers, a mouse, a stylus, a voice command, or some other user input. For some or all user inputs, a rate of the user input can be determined (e.g., a rate of speed of a swipe gesture). As another example, a length (e.g., the length of a swipe gesture) of the user input can be determined. If the user device is a touchscreen device, an amount of pressure used for the user input can be determined.

A determination is made that user interaction with the map has slowed to a level to allow for perception of content without necessarily having arrived at a final, different location, where the portion of the viewport at this time shows a second, different location (508). For example, a predetermined rate of user interaction can be identified, where the predetermined rate of user interaction is a rate of user interaction previously determined that allows for perception of content. If the current rate of user interaction is less than or equal to the predetermined rate, it can be determined that the user can perceive content that may be presented in the map application. For example, with respect to FIG. 3, the viewport 308 may represent a state that corresponds to a current user input that is in a series of swipe gesture user inputs, where the rate of the current user input is less than the predetermined rate. The location displayed in the viewport 308 may be a different location that a final location of interest (e.g., a location of Saint Paul as displayed in the viewport 318).

Automatically, without requiring the user to resubmit the query, the query is re-run for the second, different location (510). For example, the second, different location and any non-location query terms included in the initial query can be submitted to a search system or a content management/selection system. The search or content system can send one or more results to the user device. For example, with respect to FIG. 3, location information indicating the location displayed in the viewport 308 and a query term of "museum" can be submitted to the search system.

Query results are presented along with the viewport showing the second, different location (512). The results can include, for example, one or more points of interest that correspond to one or more search terms included in the query. For example, with respect to FIG. 3, a search result 312, which corresponds to the location displayed in the viewport 308 and to the query term of "museum", is displayed next to the viewport 308 and a corresponding "A" marker is displayed in the viewport 308. The results can also include other content, such as one or more advertisements. For example, a content item 314 is displayed next to the viewport 308, where the content item 314 corresponds to the location displayed in the viewport 308 and to the query term of "museum". The number, size, placement, and appearance of the search result 312 and the content item 314 may be selected so as to be perceivable to the user at the current rate of user interaction. For example, a font of a particular size can be used.

Figure 6:
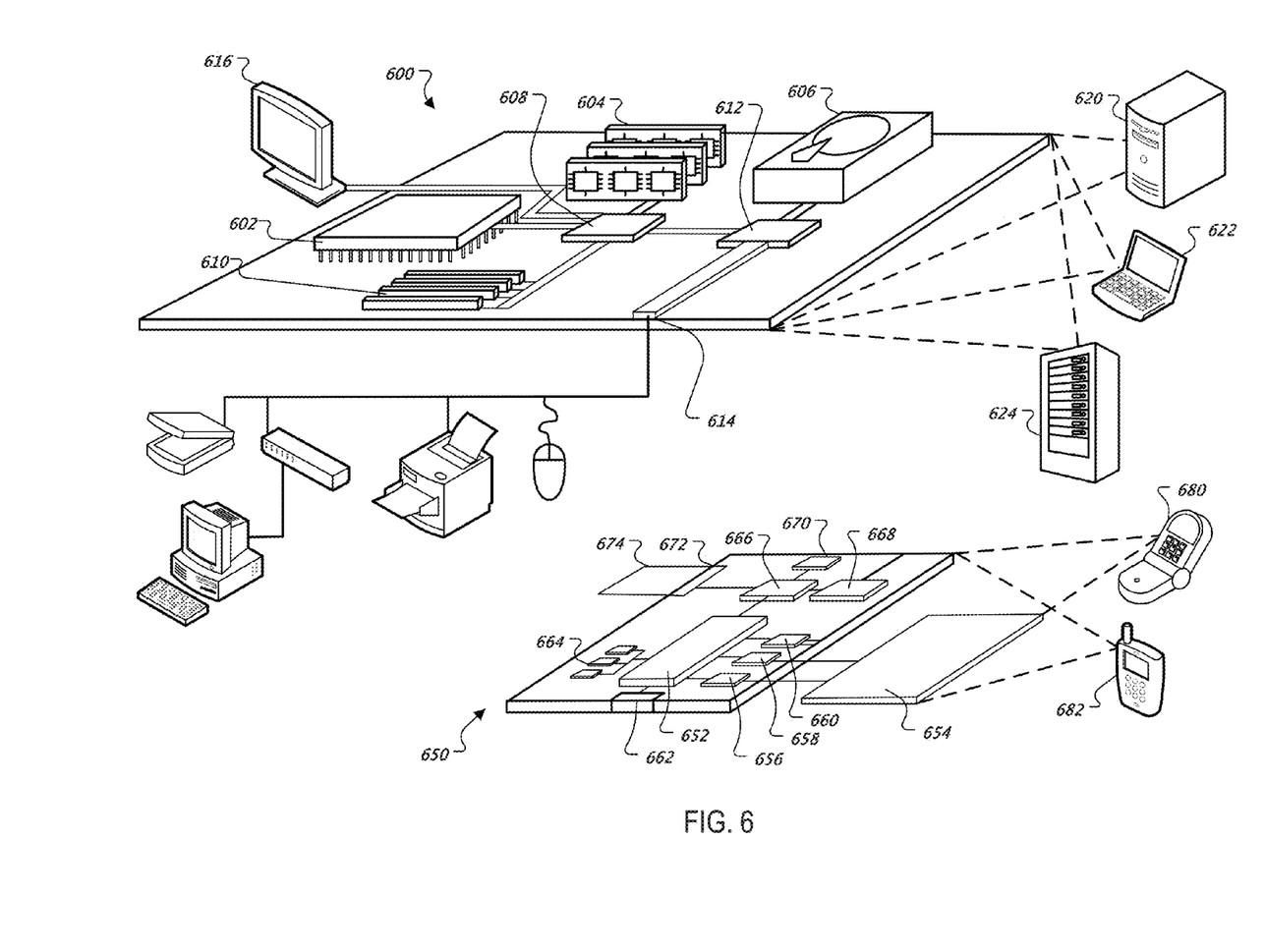
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
   presenting a map including a viewport showing a first location;
   receiving a first indication that a user is interacting with the map, including one or more first panning, scrolling, repositioning, or zooming interactions, to enable one or more intermediate locations to be visible in the viewport, without submitting a query for any of the intermediate locations;
   receiving a second indication that the user is continuing to interact with the map, including one or more second panning, scrolling, repositioning, or zooming interactions, to enable a location of interest to be visible in the viewport;
   determining, by one or more processors, that the user has arrived at the location of interest, the location of interest being visible in the viewport as a result of the second panning, scrolling, repositioning, or zooming interactions, the determining based at least in part on evaluating the first and second interactions;
   based on determining that the user has arrived at the location of interest, automatically submitting a query for the location of interest;
   receiving query results responsive to the query; and
   presenting the query results along with the viewport showing the location of interest.

2. The method of claim 1 where the map is displayed on a mobile device.

3. The method of claim 1 where the query is provided to a map application.

4. The method of claim 1 where the query results include advertisements.

5. The method of claim 1 where receiving an indication that the user is interacting includes submitting a request for more data to populate the viewport based on the panning, scrolling, repositioning, or zooming.

6. The method of claim 1 where determining that the user has arrived is based at least in part on a relative acceleration of a user's panning movement.

7. The method of claim 1 where determining that the user has arrived is based at least in part on a relative deceleration of the user's panning movement.

8. The method of claim 1 where receiving the indication that the user is interacting with the map includes receiving a mouse input.

9. The method of claim 1 where receiving the indication that the user is interacting with the map includes receiving a touch input.

10. The method of claim 1 where receiving the indication that the user is interacting with the map includes receiving a swipe gesture.

11. The method of claim 10 where determining that the user has arrived includes determining that an end to the swipe gesture has been received.

12. The method of claim 1 where determining that the user has arrived includes determining the user's intent to continue panning based on historical or previous panning steps.

13. The method of claim 1 where determining that the user has arrived further includes one or more of determining if the user stops a moving map to stop a scroll, determining if the user's movements become slower, determining if the user's movements become shorter, determining if a transition has occurred from longer motions to shorter motions, determining if minor corrections are received, or determining that corrections to reverse direction are received.

14. The method of claim 1 where determining that the user has arrived further includes one or more of determining if movement in the map ends at a conclusion of a long sweep motion, or determining if a ballistic scroll has occurred, where either of the aforementioned conditions are indicative of the user not arriving.

15. The method of claim 1 where the map is displayed on a touchscreen device.

16. The method of claim 15 where the touchscreen device is a tablet device.

17. A method comprising:
presenting a map including a viewport showing a first location;
receiving an indication that a user is interacting with the map, including panning, scrolling, repositioning, or zooming, to enable to enable one or more intermediate locations to be visible in the viewport, without submitting a query for any of the intermediate locations;
determining, by one or more processors, that user interaction with the map has slowed to a level to allow for perception of content without necessarily having arrived at a final, different location, where the portion of the viewport at this time shows a second, different location;
based on determining that user interaction with the map has slowed to a level to allow for perception of content, automatically submitting a query for the second, different location;
receiving query results responsive to the query; and
presenting the query results along with the viewport showing the second, different location.

18. The method of claim 17 where determining that user interaction with the map has slowed includes determining an initial rate of panning and a second, reduced rate of panning, where the second, reduced rate of panning is less than a threshold, and where the threshold is determined based on one or more of a size of the map, content to be displayed, and other factors.

19. The method of claim 17 where the map is displayed on a mobile device.

20. The method of claim 17 where the query is provided to a map application.

21. The method of claim 17 where the query results include advertisements.

22. The method of claim 17 where receiving an indication that the user is interacting includes receiving a request for more data to populate the viewport based on the panning, scrolling, repositioning, or zooming.

23. The method of claim 17 where determining that user interaction with the map has slowed is based at least in part on a relative acceleration of a user's panning movement.

24. The method of claim 17 where determining that user interaction with the map has slowed is based at least in part on a relative deceleration of the user's panning movement.

25. The method of claim 17 where receiving the indication that the user is interacting with the map includes receiving a mouse input.

26. The method of claim 17 where receiving the indication that the user is interacting with the map includes receiving a touch input.

27. The method of claim 17 where receiving the indication that the user is interacting with the map includes receiving a swipe motion.

28. A computer program product tangibly embodied in a non-transitory computer-readable storage device and comprising instructions that, when executed by a processor, cause the processor to:
present a map including a viewport showing a first location;
receive a first indication that a user is interacting with the map, including one or more first panning, scrolling, repositioning, or zooming interactions, to enable a one or more intermediate locations to be visible in the viewport, without submitting a query for any of the intermediate locations;
receive a second indication that the user is continuing to interact with the map, including one or more second panning, scrolling, repositioning, or zooming interactions, to enable a location of interest to be visible in the viewport;
determine that the user has arrived at the location of interest, the location of interest being visible in the viewport as a result of the second panning, scrolling, repositioning, or zooming interactions, the determining based at least in part on evaluating the first and second interactions;
based on determining that the user has arrived at the location of interest, automatically, submitting a query for the location of interest;
receive query results responsive to the query; and
present query results along with the viewport showing the location of interest.

* * * * *